(12) United States Patent
Shen et al.

(10) Patent No.: US 11,703,837 B2
(45) Date of Patent: Jul. 18, 2023

(54) SYSTEM AND METHOD FOR RECOMMENDING MAXIMUM QUANTITY OF WORK IN PROCESS, AND COMPUTER READABLE MEDIUM

(71) Applicant: BOE Technology Group Co., Ltd., Beijing (CN)

(72) Inventors: Guoliang Shen, Beijing (CN); Dong Chai, Beijing (CN); Haohan Wu, Beijing (CN); Tian Lan, Beijing (CN); Weihe Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 224 days.

(21) Appl. No.: 17/273,177

(22) PCT Filed: Nov. 29, 2019

(86) PCT No.: PCT/CN2019/121940
§ 371 (c)(1),
(2) Date: Mar. 3, 2021

(87) PCT Pub. No.: WO2021/102902
PCT Pub. Date: Jun. 3, 2021

(65) Prior Publication Data
US 2022/0113710 A1   Apr. 14, 2022

(51) Int. Cl.
*G05B 19/418* (2006.01)
(52) U.S. Cl.
CPC ... *G05B 19/41865* (2013.01); *G05B 19/4183* (2013.01)
(58) Field of Classification Search
USPC .......................................................... 700/99
See application file for complete search history.

(56) References Cited

U.S. PATENT DOCUMENTS 5,255,197 A * 10/1993 Iida ..................... G05B 19/4184
   700/115
5,838,565 A * 11/1998 Hsieh ..................... G06Q 10/06
   700/121

(Continued)

FOREIGN PATENT DOCUMENTS

| CN | 102622667 B | * | 8/2016 |
| CN | 102622667 B | * | 8/2016 |

(Continued)

OTHER PUBLICATIONS

Extended Search Report dated Oct. 13, 2022 issued in corresponding European Application No. 19945405.9.

*Primary Examiner* — Hien D Khuu
(74) *Attorney, Agent, or Firm* — Nath, Goldberg & Meyer; Joshua B. Goldberg

(57) ABSTRACT

A system for recommending a maximum quantity of work in process, in which one or more processors of a distributed storage device are configured to execute: acquiring at least part of production data stored in the distributed storage device, the production data includes quantity records and cycle time records of a production line in time periods, and the cycle time record of each time period includes a cycle time at each process station of the production line in said each time period; clustering the quantity records to obtain a plurality of initial classifications, each initial classification includes at least one quantity record; determining a portion of the initial classifications as preferred classifications; determining the maximum quantity of work in process at each process station; and a display device is configured to display the maximum quantity of work in process at each process station determined by an analysis device.

18 Claims, 7 Drawing Sheets

(56) References Cited

U.S. PATENT DOCUMENTS 6,473,721 B1 * 10/2002 Chacon .................. G06Q 10/06
702/182
2019/0137979 A1   5/2019 Kella et al.

FOREIGN PATENT DOCUMENTS

| CN | 105631554 B |   | 11/2019 |
|----|-------------|---|---------|
| CN | 112825161 A | * | 5/2021  |
| KR | 20130124208 A |   | 11/2013 |

* cited by examiner

SYSTEM AND METHOD FOR RECOMMENDING MAXIMUM QUANTITY OF WORK IN PROCESS, AND COMPUTER READABLE MEDIUM

This is a National Phase Application filed under 35 U.S.C. 371 as a national stage of PCT/CN2019/121940, filed Nov. 29, 2019, the content of which is hereby incorporated by reference in its entirety.

TECHNICAL FIELD

The present disclosure relates to the field of production process regulating and controlling, and in particular, to a system and a method for recommending a maximum quantity of work in process, and a computer readable medium.

BACKGROUND

In a production line of products such as display panels (e.g., liquid crystal display panels, organic light emitting diode display panels, etc.), the products (including semi-finished products) need to sequentially pass through a plurality of process stations, and each process station is used for performing certain processing (e.g., deposition, exposure, etching, detection, etc.).

The products waiting for processing and being processed at each process station are collectively referred to as "work in process (WIP)" at the process station.

When work in process at a certain process station is too great in quantity, products may be seriously accumulated, thereby reducing productivity and production efficiency. Therefore, determining a maximum quantity of work in process allowed by each process station (i.e., the maximum quantity of work in process) has significance for regulating and controlling the production process.

SUMMARY

Embodiments of the present disclosure provide a system and a method and for recommending a maximum quantity of work in process, and a computer readable medium.

In a first aspect, an embodiment of the present disclosure provides a system for recommending a maximum quantity of work in process, including a distributed storage device, an analysis device and a display device, wherein, the distributed storage device is configured to store production data generated by a factory device;

the analysis device includes one or more processors configured to perform following operations to determine the maximum quantity of work in process:

acquiring at least part of the production data stored in the distributed storage device, the production data includes quantity records and cycle time records of a production line in a plurality of time periods, the quantity record of each time period includes a quantity of work in process at each process station of the production line in said each time period, and the cycle time record of each time period includes a cycle time at each process station of the production line in said each time period;

clustering the quantity records to obtain a plurality of initial classifications, and each of the initial classifications includes at least one of the quantity records;

determining a portion of the initial classifications as preferred classifications according to the cycle time records corresponding to the quantity records of each of the initial classifications;

determining the maximum quantity of work in process at each process station according to at least a portion of the quantity records of the preferred classifications;

the display device is configured to display the maximum quantity of work in process at each process station determined by the analysis device.

In some implementations, the determining the portion of the initial classifications as the preferred classifications includes:

determining one of the initial classifications as the preferred classification.

In some implementations, the determining the portion of the initial classifications as the preferred classifications according to the cycle time records corresponding to the quantity records of each of the initial classifications includes:

for each initial classification, determining a ratio of classification cycle time of said each initial classification to a system cycle time, as a cycle time score of said each initial classification, the classification cycle time of said each initial classification is an average value of cycle times in the cycle time records corresponding to all the quantity records of said each initial classification, and the system cycle time is an average value of residual cycle times after removing maximum cycle times and minimum cycle times in a preset proportion from all the cycle time records;

determining a front first predetermined number of initial classifications with a maximum cycle time score or the initial classifications with cycle time scores greater than a first predetermined value as the preferred classifications.

In some implementations, the determining the maximum quantity of work in process at each process station according to at least the portion of the quantity records of the preferred classifications includes:

determining a portion of the quantity records as preferred quantity records according to a distance between each of the quantity records of the preferred classification and a cluster center of the preferred classification;

determining a proportion coefficient of each process station according to a ratio of the quantity of work in process at each process station of each preferred quantity record to a total number of products in the production line;

determining the maximum quantity of work in process at each process station according to the total number of products present in the production line and the proportion coefficient of each process station.

In some implementations, the determining the portion of the quantity records as the preferred quantity records according to the distance between each of the quantity records of the preferred classification and the cluster center of the preferred classification includes:

for each preferred classification, determining a front second predetermined number of quantity records with a smallest Euclidean distance between each of the quantity records and a cluster center of said each preferred classification or the quantity records with Euclidean distances smaller than a second predetermined value as the preferred quantity records.

In some implementations, the determining the portion of the quantity records as the preferred quantity records includes:

determining multiple ones of the quantity records as the preferred quantity records.

In some implementations, the determining the proportion coefficient of each process station according to the ratio of the quantity of work in process at each process station of each preferred quantity record to the total number of products in the production line includes:

for each preferred quantity record, determining a ratio of the quantity of work in process at each process station to the total number of products in the production line as a proportion component of said each process station corresponding to said each preferred quantity record;

determining an average value of proportion components corresponding to the preferred quantity records of each process station as the proportion coefficient of said each process station.

In some implementations, the determining the maximum quantity of work in process at each process station according to the total number of products present in the production line and the proportion coefficient of each process station includes:

for each process station, determining a product of the proportion coefficient of said each process station, the total number of products in the production line and an amplification factor, as the maximum quantity of work in process at said each process station, and the amplification factor is a preset value greater than 1.

In some implementations, the clustering is a neighbor propagation clustering.

In some implementations, the analysis device includes one or more processors configured to perform the operations of determining the maximum quantity of work in process at predetermined time intervals.

In some implementations, the at least part of the production data stored in the distributed storage device, acquired by the analysis device, includes:

quantity records and cycle time records of a predetermined number of adjacent time periods prior to a current time.

In some implementations, the production line is a production line of display panels.

In a second aspect, an embodiment of the present disclosure provides a method for recommending a maximum quantity of work in process, including:

clustering quantity records of a production line in a plurality of time periods to obtain a plurality of initial classifications, each of the initial classifications includes at least one of the quantity records, and the quantity record of each time period includes a quantity of work in process at each process station of the production line in said each time period;

determining a portion of the initial classifications as preferred classifications according to cycle time records corresponding to the quantity records of each initial classification, and the cycle time record of each time period includes a cycle time at each process station of the production line in said each time period;

determining a maximum quantity of work in process at each process station according to at least a portion of the quantity records for the preferred classifications.

In some implementations, the determining the portion of the initial classifications as the preferred classifications includes:

determining one of the initial classifications as the preferred classification.

In some implementations, the determining the portion of the initial classifications as the preferred classifications according to the cycle time records corresponding to the quantity records of each of the initial classifications includes:

for each initial classification, determining a ratio of classification cycle time of said each initial classification to a system cycle time, as a cycle time score of said each initial classification, the classification cycle time of said each initial classification is an average value of cycle times in the cycle time records corresponding to all the quantity records of said each initial classification, and the system cycle time is an average value of residual cycle times after removing maximum cycle times and minimum cycle times in a preset proportion from all the cycle time records;

determining a front first predetermined number of initial classifications with a maximum cycle time score or the initial classifications with cycle time scores greater than a first predetermined value as the preferred classifications.

In some implementations, the determining the maximum quantity of work in process at each process station according to at least the portion of the quantity records of the preferred classifications includes:

determining a portion of the quantity records as preferred quantity records according to a distance between each of the quantity records of the preferred classification and a cluster center of the preferred classification;

determining a proportion coefficient of each process station according to a ratio of the quantity of work in process at each process station of each preferred quantity record to a total number of products in the production line;

determining the maximum quantity of work in process at each process station according to the total number of products present in the production line and the proportion coefficient of each process station.

In some implementations, the determining the portion of the quantity records as the preferred quantity records according to the distance between each of the quantity records of the preferred classification and the cluster center of the preferred classification includes:

for each preferred classification, determining a front second predetermined number of quantity records with a smallest Euclidean distance between each of the quantity records and a cluster center of said each preferred classification or the quantity records with the Euclidean distances smaller than a second predetermined value as the preferred quantity records.

In some implementations, the determining the portion of the quantity records as the preferred quantity records includes:

determining multiple ones of the quantity records as the preferred quantity records.

In some implementations, the determining the proportion coefficient of each process station according to the ratio of the quantity of work in process at each process station of each preferred quantity record to the total number of products in the production line includes:

for each preferred quantity record, determining a ratio of the quantity of work in process at each process station to the total number of products in the production line as a proportion component of said each process station corresponding to said each preferred quantity record;

determining an average value of proportion components corresponding to the preferred quantity records of each process station as the proportion coefficient of said each process station.

In some implementations, the determining the maximum quantity of work in process at each process station according to the total number of products present in the production line and the proportion coefficient of each process station includes:

for each process station, determining a product of the proportion coefficient of said each process station, the total number of products in the production line and an amplification factor, as the maximum quantity of work in process at said each process station, and the amplification factor is a preset value greater than 1.

In some implementations, the clustering is a neighbor propagation clustering.

In some implementations, the quantity records of the production line in the plurality of time periods includes:

quantity records of a predetermined number of adjacent time periods prior to a current time.

In some implementations, the production line is a production line of display panels.

In a third aspect, an embodiment of the present disclosure provides a computer readable medium, on which a computer program is stored, where the computer program, when executed by a processor, implements the above method for recommending a maximum quantity of work in process.

In the embodiments of the present disclosure, the distributed storage device can efficiently collect and preliminarily process raw data of a plurality of factory devices in a big data mode, and the analysis device can conveniently acquire required data from the distributed storage device so as to calculate and obtain the maximum quantity of work in process at each process station of the production line, and display the maximum quantity by the display device. Therefore, the embodiments of the present disclosure can automatically recommend the maximum quantity of work in process to process stations in each production line, so that the user can monitor and schedule a production process according to the maximum quantity of work in process, for example, when the quantity of work in process at a certain process station approaches, reaches or exceeds the maximum quantity of work in process, an adjustment can be performed in time (for example, the number of products put into the production line may be reduced, or a portion of products may be moved out to other production lines for processing, etc.), so as to avoid affecting the productivity and the production efficiency.

DESCRIPTION OF DRAWINGS

The accompanying drawings are included to provide a further understanding of the embodiments of the present disclosure, are incorporated in and constitute a part of this specification, and serve to explain principles of the present disclosure together with the embodiments of the present disclosure, but the present disclosure is not limited thereto. The above and other features and advantages will become more apparent to those ordinary skilled in the art by describing exemplary embodiments in detail with reference to the accompanying drawings, in which.

DESCRIPTION OF EMBODIMENTS

Figure 1:
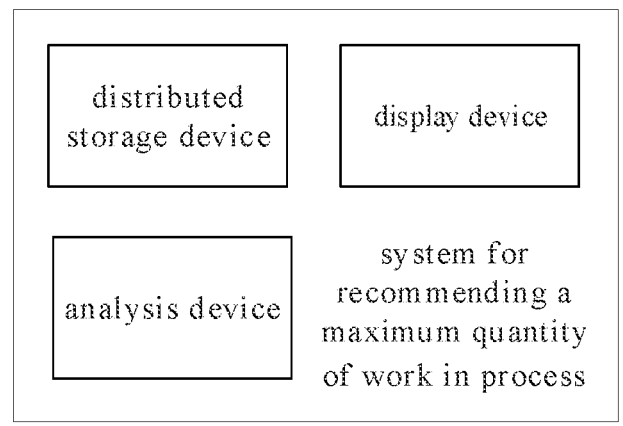
FIG. 1 is a block diagram illustrating components of a system for recommending a maximum quantity of work in process according to an embodiment of the present disclosure.

In order to make those ordinary skilled in the art better understand technical solutions of the embodiments of the present disclosure, the following describes the system and the method for recommending a maximum quantity of work in process and a computer readable medium provided in the embodiments of the present disclosure in detail with reference to the accompanying drawings.

The embodiments of the present disclosure will be described more fully hereinafter with reference to the accompanying drawings, but the embodiments shown may be embodied in different forms and the embodiments set forth herein should not be construed as limitations. Rather, these embodiments are provided so that the present disclosure will be understood thoroughly and completely, and will fully convey the scope of the present disclosure to those ordinary skilled in the art.

The embodiments of the present disclosure may be described with reference to idealized schematic illustrations of the present disclosure by referring to plan and/or cross-sectional views thereof. Accordingly, the example illustrations may be modified in accordance with manufacturing techniques and/or tolerances.

The embodiments of the present disclosure and features of the embodiments may be combined with each other without conflict.

Terminologies used in the present disclosure are for a purpose of describing particular embodiments only and are not intended to be limiting of the present disclosure. As used in the present disclosure, the term "and/or" includes any and all combinations of one or more of associated listed items. As used in the present disclosure, the singular forms "a", "an" and "the" are intended to include the plural forms as well, unless the context clearly indicates otherwise. The terms "include", "including" and "made of . . . " as used in the present disclosure, specify a presence of stated features, integers, steps, operations, elements, and/or components, but do not preclude a presence or an addition of one or more other features, integers, steps, operations, elements, components, and/or groups thereof.

Unless otherwise defined, all terms (including technical and scientific terms) used in the present disclosure have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The embodiments of the present disclosure are not limited to the embodiments shown in the drawings, but include modifications of configurations formed based on a manufacturing process. Thus, regions illustrated in the figures have schematic properties, and shapes of the regions shown in the figures illustrate specific shapes of regions of elements, but are not intended to be limiting.

In a factory, when a certain kind of products (such as display panels) are produced through a production line, the products (including semi-finished products) need to sequentially pass through a plurality of process stations, each process station includes one or more process devices, and the process devices are used for performing certain processing (such as deposition, exposure, etching, detection and the like) on the products.

Because processing speeds and processing capacities of different process stations are different, at each process station, a portion of products may be being processed therein and another portion of products may be waiting to be processed, and a total number of these two types of products is called a quantity of work in process (WIP) at said each process station.

When work in process at a certain process station is too great in quantity, it may cause that the products cannot be processed in time, so that the products are seriously accumulated, and the productivity and the production efficiency are reduced.

In the embodiments of the present disclosure, "quantity of products" refers to a quantity of basic counting units, which are commonly used in corresponding technical field, for a kind of products. For example, for a production line of display panels, lot can be used as a basic counting unit, that is, each lot is a product, and each lot generally includes a plurality of (e.g., 20) substrates (glasses), each of which corresponds to one display panel; alternatively, the substrate may be used as a basic counting unit, that is, each substrate (glass) is a product. It should be understood that the quantity of products varies only by specific numerical values when it depends on different basic counting units, and does not affect the implementation of the embodiments of the present disclosure.

In the embodiments of the present disclosure, "process station" refers to a station for performing a relatively independent processing, and depending on processing partitions, process stations obtained by specific partitions may be different. For example, a station for performing a main process (e.g., deposition, exposure, etching, etc.) and a station for performing an inspection process for the main process may be considered as one process station, or may be considered as two process stations. It should be understood that when the process partitions are different, only the number of specific process stations and the quantity of work in process at each process station may be varied without affecting the implementation of the embodiments of the present disclosure.

In the embodiments of the present disclosure. "cycle time" refers to a time duration from the time when a product enters a process station to the time when the product leaves the process station, that is, a sum of a time duration when the product waits to be processed at the process station and a time duration when the product is actually processed. It should be appreciated that because an operation efficiency, the quantity of products waiting to be processed, etc. at a process station may vary at different times, cycle times at a same process station for processing different products may be different.

In a first aspect, referring to FIG. 1, an embodiment of the present disclosure provides a system for recommending a maximum quantity of work in process.

The system of the embodiment of the present disclosure is used for determining the maximum quantity of work in process at each process station of a production line, that is, determining a maximum quantity of work in process allowed by each process station under a condition of not causing serious accumulation of products. After the maximum quantity of work in process allowed by each process station is determined, the production process can be regulated and controlled according to the maximum quantity of work in process, so that products being seriously accumulated are avoided.

The system for recommending the maximum quantity of work in process includes a distributed storage device, an analysis device and a display device.

The distributed storage device is configured to store production data generated by a factory device.

The analysis device includes one or more processors configured to perform operations to determine the maximum quantity of work in process.

The display device is configured to display the maximum quantity of work in process at each process station determined by the analysis device.

The distributed storage device stores therein production data from the factory device. The factory device refers to any device in each factory, and may include a process device at each process station, and may also include a management device for managing the production line in the factory, and the like; the production data refers to any information related to production, including which products are produced by the production line, a quantity of work in process at each process station at each time, a cycle time at each process station for each product, product information and defective information of each product, and the like.

Figure 2:
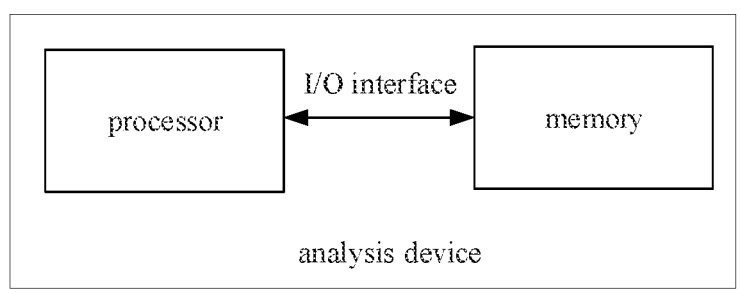
FIG. 2 is a block diagram illustrating components of an analysis device in a system for recommending a maximum quantity of work in process according to an embodiment of the present disclosure.

Referring to FIG. 2, the analysis device includes a processor (e.g., CPU) having data processing capability, and may further include a memory (e.g., hard disk) storing a desired program, and the processor is coupled to the memory through an I/O so as to enable information exchange, whereby the processor can perform a desired operation according to the program stored in the memory. In the embodiment of the present disclosure, the analysis device can extract a part of the production data stored in the distributed storage device, and calculate the maximum quantity of work in process at each process station of a production line (for example, one production line) according to the extracted data.

The display device has a display function and is used for displaying the maximum quantity of work in process calculated by the analysis device so that a user can monitor a production condition according to the maximum quantity.

The distributed storage device stores relatively complete data (such as a database), and the distributed storage device includes a plurality of hardware memories, and different hardware memories are distributed at different physical locations (such as different factories or different production lines), and mutually transmit information through a network, so that the data are in a distributed relationship, but logically form a database based on big data technology.

Figure 5:
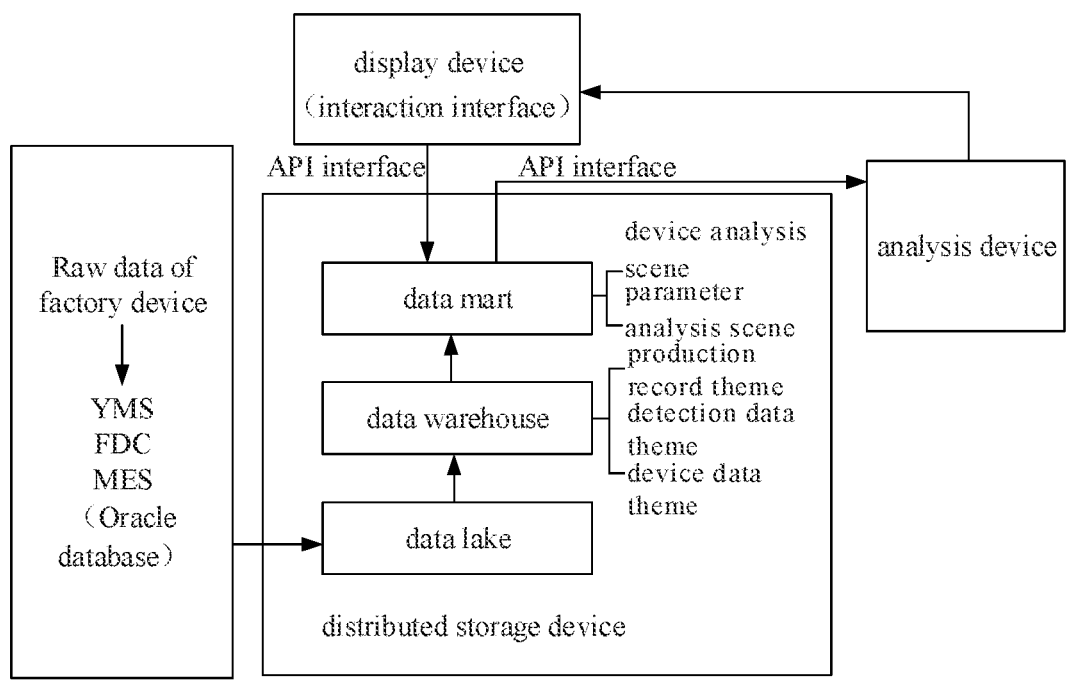
FIG. 5 is a schematic diagram illustrating a data flow in a system for recommending a maximum quantity of work in process according to an embodiment of the present disclosure.

Referring to FIG. 5, raw data of a large number of different factory, devices are stored in corresponding manufacturing systems, for example, in relational databases (such as Oracle, Mysql, etc.) of systems such as yield management system (YMS), fault detection and classification (FDC) system, manufacturing execution system (MES), etc., and the raw data can be subjected to a raw table extraction by a data extraction tool (such as Sqoop, kettle, etc.) to be transmitted to the distributed storage device (such as Hadoop Distributed File System, HDFSHadoop Distributed File System, HDFS), so as to reduce a load of the factory device and the manufacturing system, and facilitate subsequent data reading of the analysis device.

Data in the distributed storage may be stored by Hive tool or in an Hbase database format. For example, according to the Hive tool, the above raw data is first stored in a data lake; and then, preprocessing such as data cleaning and data conversion can be continuously carried out in the Hive tool according to application themes, scenes and the like, so that data warehouses with different themes (such as a production record theme, a detection data theme and a device data theme) and data marts with different scenes (such as a device analysis scene and a parameter analysis scene) are obtained. The data marts can communicate with the display device, the analysis device and the like through different API interfaces so as to realize data interaction.

Since a plurality of factory devices in a plurality of factories are involved, the above raw data is large in amount. For example, all the factory devices may produce hundreds of Gigabits of raw data per day and tens of Gigabits of raw data per hour.

There are two main schemes for realizing storage and calculation of massive structured data: a grid computing scheme of a relational database management system (RDBMS); a big data scheme of a distributed file management system (DFS).

The grid computing of the RDBMS divides a problem requiring huge computing power into a plurality of small parts, distributes the small parts to a plurality of computers for processing respectively, and finally integrates computing results. For example, as a specific example, Oracle real application clustering (RAC) is a core technology of grid computing supported by Oracle databases, where all servers have direct accesses to all data in the database. However, an application system of the grid computing of the RDBMS cannot meet user's requirements when the data is large in amount, for example, since a limited expansion space of a hardware, a low efficiency of processing data may be resulted in due to a bottleneck of input/output of a hard disk when the data is increased to a large enough order.

Distributed file management is a base big data technology, which allows a large cluster to be constructed by adopting a plurality of cheap hardware devices, so as to process massive data. For example, the Hive tool is a data warehouse tool based on Hadoop and can be used for data extraction-transformation-loading (ETL), and the Hive tool defines a simple SQL-like query language and allows complex analysis work, which cannot be completed by default tools, through a mapper and a reducer of customized MapReduce. The Hive tool has no special data storage format and no index for data, and a user can freely organize a table in the Hive tool and process data in a database. Therefore, parallel processing of the distributed file management can meet storage and processing requirements of massive data, a user can query and process simple data through SQL, and a user-defined function can be adopted for complex processing. Therefore, when analyzing massive data of a factory, data of a factory database needs to be extracted into the distributed file system, and thus, on one hand, raw data cannot be damaged, and on the other hand, an efficiency of data analysis is improved.

The display device can include one or more displays, including one or more terminals with a display function, so that the analysis device can send the maximum quantity of work in process obtained by the analysis device to the display device, and the display device can display the maximum quantity of work in process.

In some implementations, the display device may be further configured to display an "interactive interface", where the interactive interface may include a sub-interface for displaying the calculated maximum quantity of work in process, a sub-interface for controlling the system for recommending the maximum quantity of work in process to perform required work (such as task setting), and a sub-interface for displaying actual quantity of work in process present at each process station.

That is, through the "interactive interface" of the display device, it may be possible to realize a complete interaction (control and reception of results) of the user with the system for recommending the maximum quantity of work in process.

In the embodiment of the present disclosure, the distributed storage device can efficiently collect and preliminarily process the raw data of a plurality of factory devices in a big data mode, and the analysis device can conveniently acquire required data from the distributed storage device so as to calculate and obtain the maximum quantity of work in process at each process station of the production line, and the maximum quantity is displayed by the display device. Therefore, the embodiment of the present disclosure can automatically recommend the maximum quantity of work in process for each production station of the production line, so that the user can monitor and schedule the production process according to the maximum quantity of work in process, for example, when a quantity of work in process at a certain process station approaches, reaches or exceeds the maximum quantity of work in process, an adjustment can be performed in time (for example, the number of products put into the production line may be reduced, or a portion of products may be transferred to other production lines for processing, etc.), so as to avoid affecting the productivity and the production efficiency.

In some implementations, the production line is a production line of display panels.

The embodiment of the present disclosure can be used for determining the maximum quantity of work in process at each process station of the production line of display panels during the production process of the display panels (such as liquid crystal display panels, organic light emitting diode display panels and the like).

Certainly, the embodiment of the present disclosure may also be used in production lines of other products.

In some implementations, one or more processors included in the analysis device are configured to perform operations of determining the maximum quantity of work in process at predetermined time intervals.

That is, the above analysis device can periodically (for example, with a period of 1 hour) calculate the maximum quantity of work in process, so that the production process can be monitored and scheduled according to the calculated maximum quantity of work in process until a new maximum quantity of work in process is calculated.

Certainly, the operations of determining the maximum quantity of work in process may be performed in other manners, for example, may be performed when the user feels it necessary to update the maximum quantity of work in process.

Figure 3:
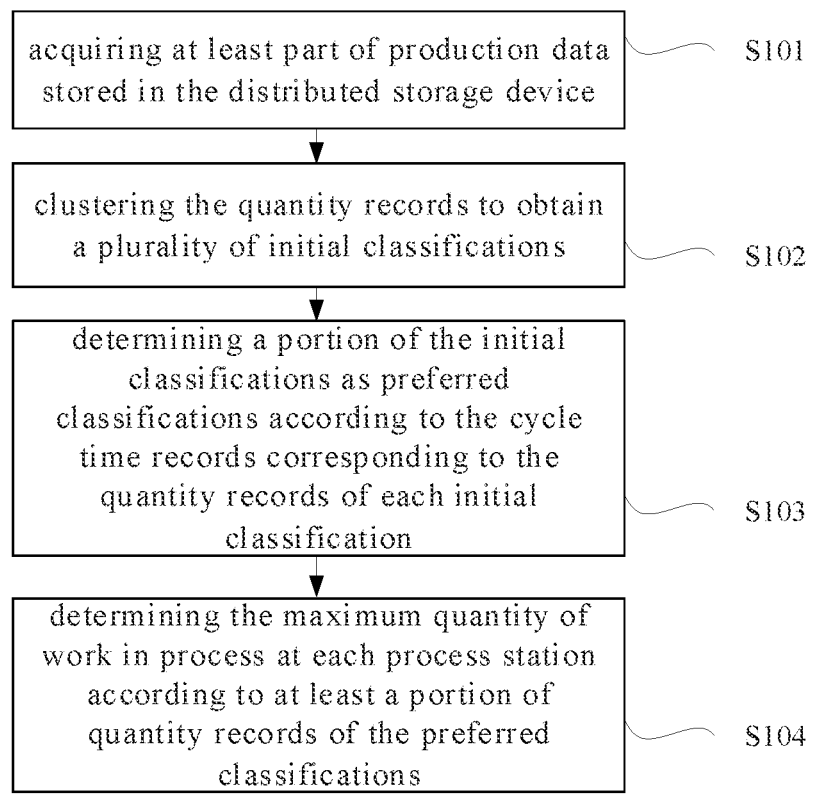
FIG. 3 is a flowchart illustrating operations performed by an analysis device in a system for recommending a maximum quantity of work in process according to an embodiment of the present disclosure.

Referring to FIG. 3, in some implementations, the operations performed by the one or more processors of the above analysis device to determine the maximum quantity of work in process may include following steps S101 to S104.

S101, acquiring at least part of production data stored in the distributed storage device.

The production data includes quantity records and cycle time records of the production line in a plurality of time periods, the quantity record for each time period includes a quantity of work in process (WIP) at each process station of the production line during said each time period, and the cycle time record for each time period includes a cycle time at each process station of the production line during said each time period.

That is, the analysis device extracts part of required production data from the above distributed storage device (in particular, a data warehouse) for subsequent calculation. The required (or extracted) production data for each specific calculation includes data for a same production line in a plurality of different time periods, specifically, includes quantity records (recording the quantity of work in process at each process station of the production line) and cycle time records (recording the cycle time at each process station of the production line) of the plurality of time periods.

Each time period is a time period for performing statistics, for example, may be 1 hour, and the data (quantity records and cycle time records) of each time period is obtained statistically in said each time period. Thus, the number of the quantity records and the cycle time records in different time periods are varied.

A value of the data for one time period may be an average of corresponding data over the one time period. For example, in 1 hour, for a certain process station, an instantaneous quantity of work in process may be counted every 10 minutes, and an average of counted quantities of work in process at multiple times is used as the quantity of work in process at the process station in the time period. For another example, in 1 hour, a plurality, of products that are actually processed at a process station may be counted, and each of the products has a corresponding cycle time (cycle times for different products may be the same or different), and an average of the cycle times may be the cycle time for the process station during the time period.

Certainly, it may be possible to use other values such as a maximum value, a minimum value, a value closest to a certain time point, etc. of the data in a time period as the value of the data in the time period.

In some implementations, the at least part of the production data stored in the distributed storage device, acquired by the analysis device, includes: quantity records and cycle time records of a predetermined number of adjacent time periods prior to a current time.

That is, the data used in each calculation of the maximum quantity of work in process may be data for all time periods within a predetermined time duration prior to the time point at which the calculation is performed. For example, if the maximum quantity of work in process is calculated at 10 o' clock in a day, the data of all time periods (e.g., each time period is 1 hour) in the time duration from 10 o' clock in a third day before to the present (10 o' clock today) may be used.

Certainly, it may be possible if the above time periods are chosen in another way, for example, a plurality of discrete time periods may be used.

In some implementations, the quantity records and the cycle time records extracted above may be subjected to a data preprocessing.

The data preprocessing (e.g., data cleaning) may specifically include one-hot encoding, data fusion, discrete value processing (such as boxed graph method), redundant data deletion, null value processing (such as deletion, gap filling, etc.), and the like, and is used to eliminate irregular data, so as to facilitate the data to be used in subsequent calculation.

Specifically, a data preprocessing process may be performed after the analysis device extracts the data, or may be performed on the data in the data mart by the distributed storage device.

S102, clustering the quantity records to obtain a plurality of initial classifications.

Each initial classification includes at least one of the quantity records.

As mentioned above, each quantity record includes quantities of work in process of a plurality (e.g., n) of process stations in the production line, and thus corresponds to a "point" of an n-dimensional space, a coordinate of each dimension of the "point" is the quantity of work in process at one process station. For example, if the production line includes 200 process stations (i.e., n=200), then each quantity record includes quantities of work in process for the 200 process stations, corresponding to a point in a 200-dimensional space.

Thus, each quantity record may be a "point", and all points may be clustered based on spatial locations of the points to sort different points (quantity records) into different initial classifications, and each initial classification includes one or more quantity records that are relatively closely located.

In some implementations, the clustering is specifically a neighbor propagation clustering (AP clustering).

Neighbor propagation clustering, also known as AP (affinity propagation) clustering, is used to classify a plurality of points in a multidimensional space into a plurality of classifications according to their positions, and each classification includes a plurality of points relatively centrally distributed in the multidimensional space.

The logic of the AP clustering algorithm is to regard all points as potential clustering centers, analyze the relationship among different points in an iterative mode, find out the points which are actually suitable for being used as the clustering centers and the points which are actually suitable for belonging to each classification, and thus obtain a plurality of classifications. For example, for any two points i and k to be clustered, the following definitions may be made:

an attractiveness matrix is R (i, k), which represents a degree that k is suitable to be used as a cluster center for i;

an attribution degree matrix is A (i, k), which represents a degree that i is suitable for taking k as the cluster center (or a degree that i belongs to a classification taking k as the cluster center);

a similarity matrix is S (i, k), which represents a degree of similarity between i and k;

an iterative operation may then be performed by the following set of equations:

$$R_{t+1}(i, k) = (1 - \lambda) \cdot R_{t+1}(i, k) + \lambda \cdot R_t(i, k);$$

-continued $$R_{t+1}(i, k) = \begin{cases} S(i, k) - \max_{j \neq k}\{A_t(i, j) + R_t(i, j)\}, i \neq k \\ S(i, k) - \max_{j \neq k}\{S(i, j)\}, i = k \end{cases};$$

$$A_{t+1}(i, k) = (1 - \lambda) \cdot A_{t+1}(i, k) + \lambda \cdot A_t(i, k);$$

$$A_{t+1}(i, k) = \begin{cases} \min\left\{0, R_{t+1}(k, k) + \sum_{j \notin \{i,k\}} \max\{0, R_{t+1}(j, k)\}\right\}, i \neq k \\ \sum_{j \neq k} \max\{0, R_{t+1}(j, k)\}, i = k \end{cases};$$

the above iterative operation is equivalent to sequentially calculating appropriateness of each point as a clustering center and appropriateness of each point belonging to different classifications, so that it can be determined that there are multiple clustering centers (i.e., how many classifications all the points should be classified) in all the points, and which clustering center each point should correspond to (i.e., which points are in each classification).

S103, determining a portion of the initial classifications as preferred classifications according to the cycle time records corresponding to the quantity records of each initial classification.

After clustering the quantity records, there are multiple ones of the quantity records in each initial classification. It is obvious that each quantity record is data for a certain time period, and there should be a cycle time record for said certain time period, whereby the cycle time record and the quantity record for a same time period correspond to each other. Therefore, corresponding cycle time records can be found according to the quantity, records in each initial classification, and a portion of the initial classifications are determined as the preferred classifications according to the cycle time records for subsequent calculation.

In some implementations, the determining the portion of the initial classifications as the preferred classifications (step S103) includes: determining one of the initial classifications as the preferred classification.

To simplify the calculation process, in the above step S103, only one of the initial classifications may be selected as the preferred classification.

Certainly, it should be understood that multiple preferred classifications could be selected out in the step.

Figure 4:
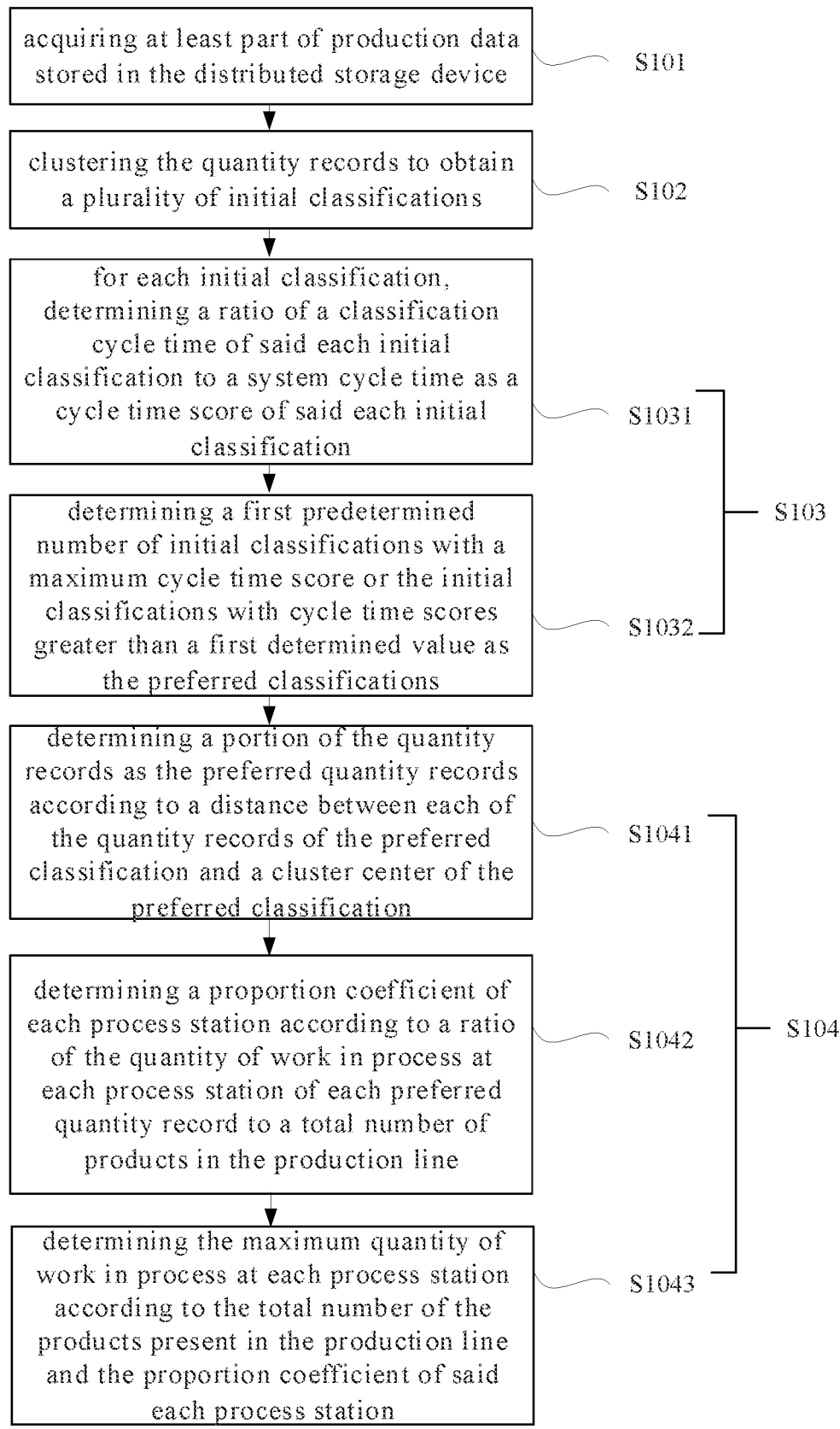
FIG. 4 is another flowchart illustrating operations performed by an analysis device in a system for recommending a maximum quantity of work in process according to an embodiment of the present disclosure.

In some implementations, referring to FIG. 4, the determining the portion of the initial classifications as the preferred classifications according to the cycle time records corresponding to the quantity records of each initial classification (step S103) includes following steps S1031 and S1032.

S1031, for each initial classification, determining a ratio of a classification cycle time of said each initial classification to a system cycle time as a cycle time score of said each initial classification.

The classification cycle time of each initial classification is an average value of cycle times in the cycle time records corresponding to all the quantity records of said each initial classification, and the system cycle time is an average value of residual cycle times after removing maximum cycle times and minimum cycle times in a preset proportion from all the cycle time records.

To determine the preferred classifications, the cycle time score of each initial classification is first calculated, the cycle time score sc being calculated by the following formula:

$$sc = \frac{ct}{Ect}.$$

The et is the classification cycle time of the initial classification, that is, an average value of cycle times corresponding to all process stations in the points (quantity records) belonging to the initial classification, for example, if the initial classification includes 10 quantity records, the 10 quantity records belong to 10 time periods respectively, the 10 time periods have 10 cycle time records, and each cycle time record includes cycle times of 200 process stations, and thus the classification cycle time et is an average value of the 10×200, i.e., total 2000, cycle times.

The Ect is the system cycle time, which represents an average value of residual cycle times after removing maximum cycle times of a preset proportion and minimum cycle times of the preset proportion from all cycle times of all process stations of all the cycle time records (i.e., obtained cycle time records of all time periods), for example, if total cycle time records of 50 time periods are obtained and each cycle time record includes cycle times of 200 process stations, then there are 50×200, i.e., 10000, cycle times, and if the preset proportion is 10%, 1000 maximum cycle times and 1000 minimum cycle times should be removed from the 10000 cycle times, and the average value of the residual 8000 cycle times is taken as the system cycle time Ect.

S1032, determining a front first predetermined number of initial classifications with a maximum cycle time score or the initial classifications with cycle time scores greater than a first determined value as the preferred classifications.

After the cycle time score of each initial classification is obtained, the front first predetermined number (for example, 1) of initial classifications with the maximum cycle time score may be selected as the preferred classifications, or the initial classifications with the cycle time scores greater than the predetermined value (for example, 0.8, 0.9, etc.) may be selected as the preferred classifications.

S104, determining the maximum quantity of work in process at each process station according to at least a portion of quantity records of the preferred classifications.

After the preferred classifications are obtained, a portion of the quantity records are continuously selected from the preferred classifications as preferred quantity records, and the maximum quantity of work in process at each process station is obtained according to the preferred quantity records.

In some implementations, referring to FIG. 4, the determining the maximum quantity of work in process at each process station according to at least the portion of the quantity records of the preferred classifications (step S104) includes following steps S1041 to S1043.

S1041, determining a portion of the quantity records as the preferred quantity records according to a distance between each of the quantity records of the preferred classification and a cluster center of the preferred classification.

To determine the maximum quantity of work in process, a portion of the quantity records of the preferred classification are selected as preferred quantity records for subsequent calculation according to the distance between each of the quantity records and the cluster center of the preferred classification.

In some implementations, the step S1041 includes: for each preferred classification, determining a front second predetermined number of quantity records with a smallest Euclidean distance between each of the quantity records and the cluster center of the preferred classification or the quantity records with Euclidean distances smaller than a second predetermined value in the preferred classification as the preferred quantity records.

For each preferred classification, an Euclidean distance between each point (quantity record) and the cluster center may be calculated, and a predetermined number (e.g., 3) of quantity records with the smallest Euclidean distance may be used as the preferred quantity records, or the quantity records with Euclidean distances smaller than a predetermined value may be used as the preferred quantity records.

The above Euclidean distance may be a "weighted Euclidean distance", and the weighted Euclidean distance in each classification is affected by a specific attenuation coefficient, because the weighted Euclidean distance between each point (quantity record) and the corresponding cluster center can be obtained in a process of AP clustering, and a computation amount can be reduced by using the weighted Euclidean distance for evaluation.

Certainly, it will be appreciated that since the quantity records subjected to comparison of Euclidean distances in the step necessarily belong to one preferred classification, whether using the weighted Euclidean distance or not has no effect on the preferred quantity records that are finally selected.

In some implementations, the step S1041 includes: determining multiple ones of the quantity records as the preferred quantity records.

To reduce an effect of contingencies, a plurality of preferred quantity, records may be selected for subsequent calculation. For example, one preferred classification (e.g., the initial classification with the maximum cycle time score) may be selected from the initial classifications, and a plurality (e.g., 3) of preferred quantity records (e.g., 3 quantity records with the smallest Euclidean distance from the cluster center) may be selected from the preferred classification.

Certainly, the above preferred quantity records may be obtained from a plurality of preferred classifications.

As to the "point (quantity record)" as the cluster center, whether it can be regarded as the preferred quantity record or not can be determined as necessary, and it is not described in detail here.

S1042, determining a proportion coefficient of each process station according to a ratio of the quantity of work in process at each process station of each preferred quantity record to a total number of products in the production line.

For each preferred quantity record, a certain proportional relationship (proportion coefficient) must exist between the quantity of work in process at each process station and a total quantity of work in process at all process stations in the preferred quantity records (i.e., the total number of products in the production line), and thus the maximum quantity of work in process at each process station can be calculated according to the proportion coefficient.

The proportion coefficient of the process station represents a ratio of the quantity of work in process at the process station to the number of all products in the production line in a relatively reasonable process flow.

In some implementations, when a plurality of preferred quantity records are selected, the step S1042 includes: for each preferred quantity record; determining a ratio of the quantity of work in process at each process station to a total number of products in the production line as a proportion component of said each process station corresponding to said each preferred quantity record; and for each process station, determining an average value of proportion components of said each process station corresponding to the preferred quantity records as the proportion coefficient of said each process station.

When a plurality of preferred quantity records are selected, for each preferred quantity record, a ratio (proportion component) of the quantity of work in process at each process station to a total number of products in the corresponding production line can be calculated, and an average value of proportion components of a same process station in the preferred quantity records is the proportion coefficient of the process station. For example, for any process station a, the proportion coefficient $SCEa$ can be calculated by the following formula:

$$SCEa = \frac{\sum_{b=1}^{m} \frac{Wba}{Wbs}}{m};$$

where $Wba$ is the quantity of work in process at the process station a in the preferred quantity record b, $Wbs$ is the total number of products in the production line in the preferred quantity record b; and m is the total number of the preferred quantity records (e.g., m=3).

S1043, determining the maximum quantity of work in process at each process station according to the total number of the products present in the production line and the proportion coefficient of said each process station:

After the proportion coefficient is determined, the maximum quantity of work in process at each process station can be finally determined according to the total number of the products present in the production line and the proportion coefficient of said each process station.

The "total number of the products present in the production line" indicates the total number of products that the production line should (or is planned to) produce during a current time duration. For example, if the method of the embodiment of the present disclosure is performed at 1 hour intervals, a planned output of the production line (i.e., the number of products planned to be put into the production line) in a current 1 hour may be used as the total number of products present in the production line.

In some implementations, the step S1041 includes: for each process station, determining a product of the proportion coefficient of said each process station, the total number of products in the production line and an amplification factor, as the maximum quantity of work in process at said each process station, and the amplification factor is a preset value greater than 1.

That is, the maximum quantity of work in process at the process station can be obtained by multiplying the proportion coefficient of the process station by the total number of products that the production line should produce in the current time duration and the amplification factor greater than 1.

The result of multiplying the proportion coefficient of each process station by the total number of products present in the production line indicates a preferred quantity of work in process that said each process station should have according to the total number of products currently required to be produced in the production line; obviously, the maximum quantity of work in process should be greater than the preferred quantity of work in process, and thus the amplification factor should further be multiplied to get the maximum quantity of work in process at said each process station.

The amplification factor can be set as desired, but is necessarily greater than 1, for example, it may be any value between 80 and 120, for example, may be 100.

Figure 6:
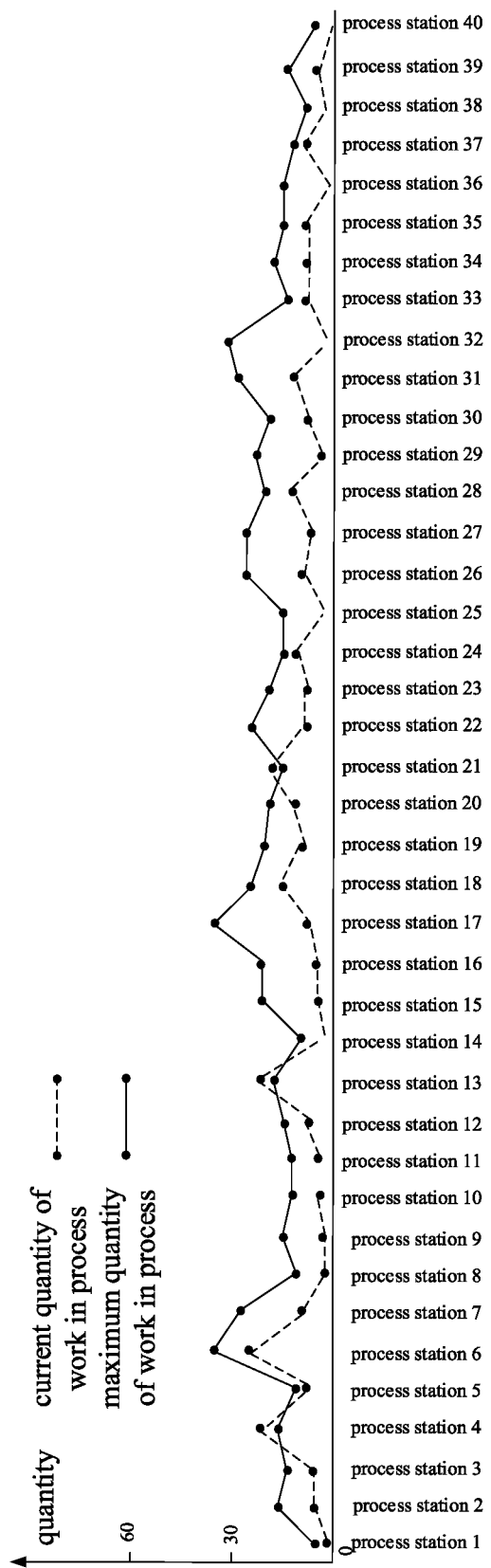
FIG. 6 is a schematic diagram of maximum quantities of work in process at a portion of process stations obtained by a system for recommending a maximum quantity of work in process according to an embodiment of the present disclosure.

For example, in a certain calculation process, obtained maximum quantities of work in process (WIP) at a portion of process stations, and current actual quantities of work in process at a portion of process stations can be referred to FIG. 6. It can be seen that current quantities of work in process at most of the processing stations in FIG. 6 are at corresponding maximum quantities of work in process, and thus corresponding adjustment is required.

Figure 7:
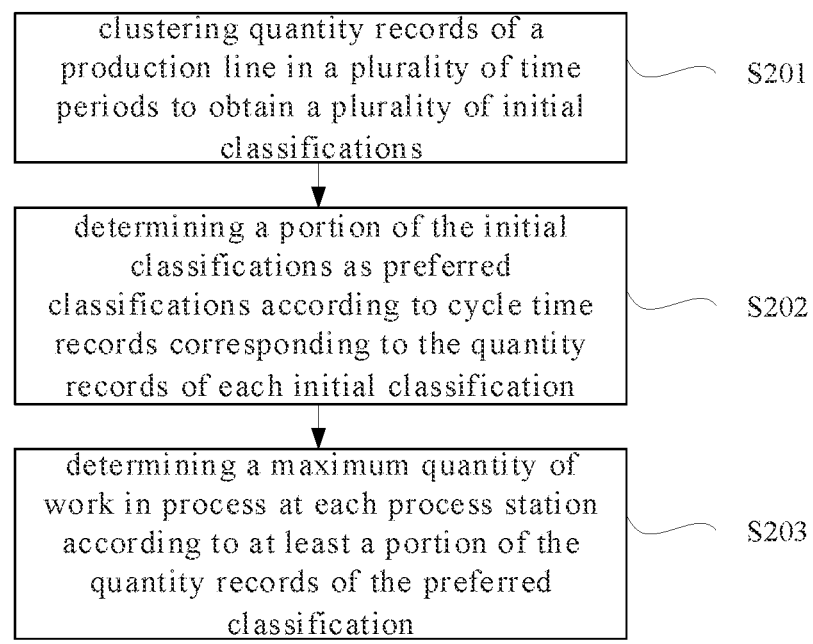
FIG. 7 is a flowchart of a method for recommending a maximum quantity of work in process according to an embodiment of the present disclosure.

In a second aspect, referring to FIG. 7, an embodiment of the present disclosure provides a method for recommending a maximum quantity of work in process, and the method includes following steps S201 to S203.

S201, clustering quantity records of a production line in a plurality of time periods to obtain a plurality of initial classifications.

Each initial classification includes at least one of the quantity records, and the quantity record for each time period includes the quantity of work in process at each process station of the production line for said each time period.

S202, determining a portion of the initial classifications as preferred classifications according to cycle time records corresponding to the quantity records of each initial classification.

The cycle time record for each time period includes a cycle time at each process station of the production line during said each time period.

S203, determining a maximum quantity of work in process at each process station according to at least a portion of the quantity records of the preferred classification.

The method of the embodiment of the present disclosure is used for determining the maximum quantity of work in process at each process station of the production line in the factory, so that a user can monitor and schedule the production process according to the maximum quantity of work in process.

In some implementations, the determining the portion of the initial classifications as the preferred classifications includes:

determining one of the initial classifications as the preferred classification.

Figure 8:
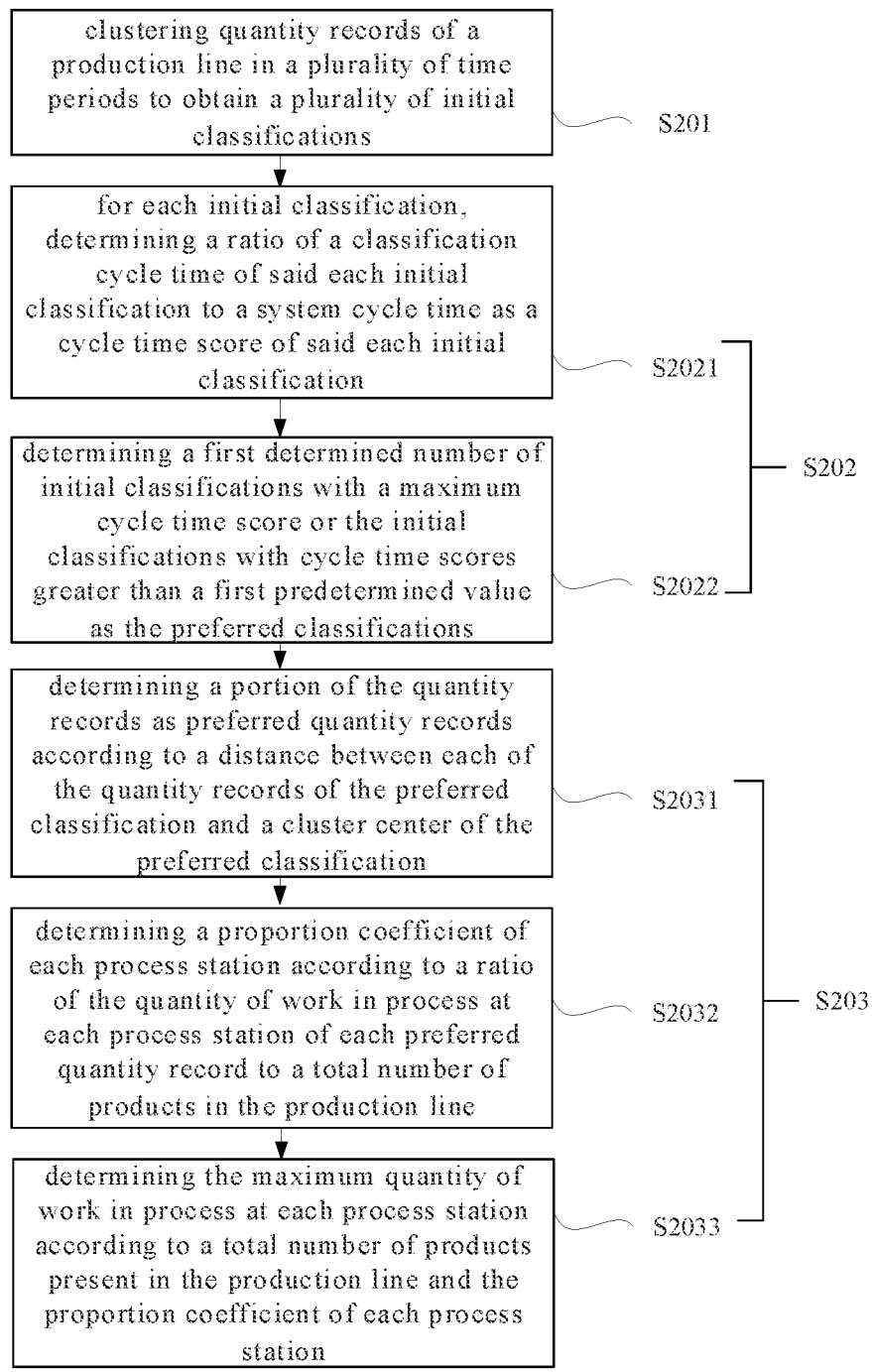
FIG. 8 is another flowchart of a method for recommending a maximum quantity of work in process according to an embodiment of the present disclosure.

Referring to FIG. 8, in some implementations, the determining the portion of the initial classifications as the preferred classifications according to the cycle time records corresponding to the quantity records of each initial classification (step S202) includes following steps S2021 and S2022.

S2021, for each initial classification, determining a ratio of a classification cycle time of said each initial classification to a system cycle time as a cycle time score of said each initial classification, the classification cycle time of each initial classification is an average value of cycle times in cycle time records corresponding to all the quantity records of the initial classification, and the system cycle time is an average value of residual cycle times after removing maximum cycle times and minimum cycle times in a preset proportion from all the cycle time records.

S2022, determining a first determined number of initial classifications with a maximum cycle time score or the initial classifications with cycle time scores greater than a first predetermined value as the preferred classifications.

Referring to FIG. 8, in some implementations, the determining the maximum quantity of work in process at each process station according to at least a portion of the quantity records for the preferred classification (step S203) includes following steps S2031 to S2033.

S2031, determining a portion of the quantity records as preferred quantity records according to a distance between each of the quantity records of the preferred classification and a cluster center of the preferred classification.

S2032, determining a proportion coefficient of each process station according to a ratio of the quantity of work in process at each process station of the preferred quantity records to a total number of products in the production line.

S2033, determining the maximum quantity of work in process at each process station according to a total number of products present in the production line and the proportion coefficient of each process station.

In some implementations, the determining the portion of the quantity records as the preferred quantity records according to a distance between each of the quantity records of the preferred classification and a cluster center of the preferred classification includes:

for each preferred classification, determining a front second predetermined number of quantity records with a smallest Euclidean distance between each of the quantity records and a cluster center of said each preferred classification or the quantity records with Euclidean distances smaller than a second predetermined value in the preferred classification as the preferred quantity records.

In some implementations, the determining the portion of the quantity records as the preferred quantity records includes:

determining multiple ones of the quantity records as the preferred quantity records.

In some implementations, the determining the proportion coefficient of each process station according to a ratio of the quantity of work in process at each process station of the preferred quantity records to a total number of products in the production line includes:

for each preferred quantity record, determining a ratio of the quantity of work in process at each process station to a total number of products in the production line as a proportion component of said each process station corresponding to said each preferred quantity record;

for each process station, determining an average value of proportion components corresponding to the preferred quantity records of said each process station as the proportion coefficient of said each process station.

In some implementations, the determining the maximum quantity of work in process at each process station according to the total number of products present in the production line and the proportion coefficient of each process station includes:

for each process station, determining a product of the proportion coefficient of said each process station, the total number of products present in the production line and an amplification factor as the maximum quantity of work in process at said each process station, and the amplification factor is a preset value greater than 1.

In some implementations, the clustering is a neighbor propagation clustering.

In some implementations, the quantity records of the time periods includes:

quantity records of a predetermined number of adjacent time periods prior to a current time.

In some implementations, the production line is a production line of display panels.

Figure 9:
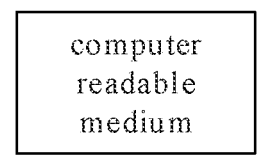
FIG. 9 is a block diagram of a computer readable medium according to an embodiment of the present disclosure.

In a third aspect, with reference to FIG. 9, an embodiment of the present disclosure provides a computer readable medium, on which a computer program is stored, and the computer program, when executed by a processor, implements the above method for recommending a maximum quantity of work in process.

One of ordinary skill in the art will appreciate that all or some of the steps, functional modules/units in the device or system, disclosed above may be implemented as software, firmware, hardware, and suitable combinations thereof.

In a hardware implementation, a division between the functional modules/units mentioned in the above description does not necessarily correspond to a division of physical components; for example, one physical component may have multiple functions, or one function or step may be performed by several physical components in cooperation.

Some or all of the physical components may be implemented as software executed by a processor, such as central processing unit (CPU), digital signal processor, or microprocessor, or may be implemented as hardware, or as an integrated circuit, such as application specific integrated circuit. Such software may be distributed on a computer readable medium, which may include computer storage medium (or non-transitory medium) and communication medium (or transitory medium). As well known to those ordinary skilled in the art, the term "computer storage medium" includes volatile and nonvolatile, removable and non-removable medium implemented in any method or technology for storage of information such as computer readable instructions, data structures, program modules or other data. The computer storage medium includes, but is not limited to, random access memory (RAM, in particular, SDRAM, DDR, etc.), read only memory (ROM), electrically erasable programmable read only memory (EEPROM), flash memory (FLASH), or other disk storage; compact disk read only memory (CD-ROM), digital versatile disk (DVD), or other optical disk storage; magnetic cassettes, magnetic tape, magnetic disk storage or other magnetic storage; any other medium which can be used to store desired information and can be accessed by a computer. In addition, as well known to those ordinary skilled in the art, the communication medium typically embodies computer readable instructions, data structures, program modules or other data in a modulated data signal such as a carrier wave or other transport mechanism, and includes any information delivery medium.

The present disclosure provides example embodiments, and although specific terms are employed, they are used and should be interpreted in a generic and descriptive sense only and not for purposes of limitation. In some instances, as apparent to one ordinary skilled in the art, features, characteristics and/or elements described in connection with a particular embodiment may be used alone or in combination with features, characteristics and/or elements described in connection with other embodiments, unless expressly stated otherwise. It will, therefore, be understood by those ordinary skilled in the art that various changes in form and details may be made therein without departing from the scope of the present disclosure as set forth in the appended claims.

The invention claimed is:

1. A system for determining a maximum quantity of work in process, comprising:
   a distributed storage device, an analysis device and a display device, wherein,
   the distributed storage device is configured to store production data generated by a factory device;
   the analysis device comprises one or more processors configured to perform following operations of determining the maximum quantity of work in process:
   acquiring at least part of the production data stored in the distributed storage device, the production data comprises quantity records and cycle time records of a production line in a plurality of time periods, the quantity record of each time period comprises a quantity of work in process at each process station of the production line in said each time period, and the cycle time record of each time period comprises a cycle time at each process station of the production line in said each time period;
   clustering the quantity records to obtain a plurality of initial classifications, and each of the initial classifications includes at least one of the quantity records;
   determining a portion of the initial classifications as preferred classifications according to cycle time records corresponding to the quantity records of each initial classification; and
   determining the maximum quantity of work in process at each process station according to at least a portion of the quantity records of the preferred classification, the maximum quantity of work in process at each process station being the maximum quantity of work in process allowed by each process station; and
   the display device is configured to display to a user the maximum quantity of work in process at each process station determined by the analysis device, wherein the user monitors and controls the quantity of work in process at each process station to be no more than the maximum quantity of work in process allowed by each process station,
   wherein the determining the maximum quantity of work in process at each process station according to at least the portion of the quantity records of the preferred classification comprises:
   determining the portion of the quantity records as the preferred quantity records according to a distance between each of the quantity records of the preferred classification and a cluster center of the preferred classification;
   determining a proportion coefficient of each process station according to a ratio of the quantity of work in process at each process station of each preferred quantity record to a total number of products in the production line; and
   determining the maximum quantity of work in process at each process station according to the total number of products present in the production line and the proportion coefficient of each process station.

2. The system of claim 1, wherein the determining the portion of the initial classifications as preferred classification comprises:
   determining one of the initial classifications as the preferred classification.

3. The system of claim 1, wherein the determining the portion of the initial classifications as the preferred classifications according to the cycle time records corresponding to the quantity records of each initial classification comprises:
   for each initial classification, determining a ratio of a classification cycle time of said each initial classification to a system cycle time as a cycle time score of said each initial classification;
   the classification cycle time of each initial classification is an average value of cycle times in the cycle time records corresponding to all the quantity records of said each initial classification, and the system cycle time is an average value of residual cycle times after removing maximum cycle times and minimum cycle times in a preset proportion from all the cycle time records;

determining a front first predetermined number of initial classifications with a maximum cycle time score or the initial classifications with cycle time scores greater than a first predetermined value as the preferred classifications.

4. The system of claim 1, wherein the determining the portion of the quantity records as the preferred quantity records according to the distance between each of the quantity records of the preferred classification and the cluster center of the preferred classification comprises:

for each preferred classification, determining a front second predetermined number of quantity records with a smallest Euclidean distance between each of the quantity records and a cluster center of the preferred classification or the quantity records with Euclidean distances smaller than a second predetermined value in the preferred classification as the preferred quantity records.

5. The system of claim 1, wherein the determining the portion of the quantity records as the preferred quantity records comprises:

determining multiple ones of the quantity records as the preferred quantity records.

6. The system of claim 5, wherein the determining the proportion coefficient of each process station according to the ratio of the quantity of work in process at each process station of the preferred quantity records to the total number of products in the process line comprises:

for each preferred quantity record, determining a ratio of the quantity of work in process at each process station to a total number of products in the production line as a proportion component of said each process station corresponding to said each preferred quantity record;

determining an average value of proportion components corresponding to the preferred quantity records of each process station as the proportion coefficient of said each process station.

7. The system of claim 1, wherein the determining the maximum quantity of work in process at each process station according to the total number of products present in the production line and the proportion coefficient of each process station comprises:

for each process station, determining a product of the proportion coefficient of said each process station, the total number of products present in the production line and an amplification factor as the maximum quantity of work in process at said each process station, the amplification factor is a preset value greater than 1.

8. The system of claim 1, wherein,
the clustering is a neighbor propagation clustering.

9. The system of claim 1, wherein,
the one or more processors are configured to perform the operations of determining the maximum quantity of work in process at predetermined time intervals.

10. The system of claim 1, wherein the at least the part of the production data stored in the distributed storage device, acquired by the analysis device comprising:

quantity records and cycle time records of a predetermined number of adjacent time periods prior to a current time.

11. The system of claim 1, wherein,
the production line is a production line of display panels.

12. A method for determining a maximum quantity of work in process, comprising:

clustering quantity records of a production line in a plurality of time periods to obtain a plurality of initial classifications, each of the initial classifications comprises at least one of the quantity records, the quantity record of each time period comprises a quantity of work in process at each process station of the production line during said each time period;

determining a portion of the initial classifications as preferred classifications according to cycle time records corresponding to the quantity records of each initial classification, the cycle time record of each time period comprises a cycle time at each process station of the production line in said each time period;

determining the maximum quantity of work in process at each process station according to at least a portion of the quantity records of the preferred classification, the maximum quantity of work in process at each process station being the maximum quantity of work in process allowed by each process station; and monitoring and controlling the quantity of work in process at each process station to be no more than the maximum quantity of work in process allowed by each process station, wherein the determining the maximum quantity of work in process at each process station according to at least the portion of the quantity records of the preferred classification comprises:

determining the portion of the quantity records as the preferred quantity records according to a distance between each of the quantity records of the preferred classification and a cluster center of the preferred classification;

determining a proportion coefficient of each process station according to a ratio of the quantity of work in process at each process station of each preferred quantity record to a total number of the products in the production line; and determining the maximum quantity of work in process at each process station according to the total number of products present in the production line and the proportion coefficient of each process station.

13. The method of claim 12, wherein the determining the portion of the initial classifications as the preferred classifications according to the cycle time records corresponding to the quantity records of each initial classification comprises:

for each initial classification, determining a ratio of a classification cycle time of said each initial classification and a system cycle time as a cycle time score of said each initial classification, the classification cycle time of each initial classification is an average value of cycle times in cycle time records corresponding to all the quantity records of said each initial classification, and the system cycle time is an average value of residual cycle times after removing maximum cycle times and minimum cycle times in a preset proportion from all the cycle time records;

determining a first determined number of initial classifications with a maximum cycle time score or the initial classifications with cycle time scores greater than a first predetermined value as the preferred classifications.

14. The method of claim 12, wherein the determining the portion of the quantity records as the preferred quantity records according to the distance between each of the quantity records of the preferred classification and the cluster center of the preferred classification comprises:

for each preferred classification, determining a front second predetermined number of quantity records with a smallest Euclidean distance between each of the quantity records of the preferred classification and a cluster center of the preferred classification or the quantity records with Euclidean distances smaller than a second predetermined value in the preferred classification as the preferred quantity records.

15. The method of claim 12, wherein the determining the portion of the quantity records as the preferred quantity records comprises:

determining multiple ones of the quantity records as the preferred quantity records.

16. The method of claim 15, wherein the determining the proportion coefficient for each process station according to the ratio of the quantity of work in process at each process station of each preferred quantity to the total number of products in the process line comprising:

for each preferred quantity record, determining a ratio of the quantity of work in process at each process station to a total number of products in the production line as a proportion component of said each process station corresponding to said each preferred quantity record;

determining an average value of proportion components corresponding to the preferred quantity records of each process station as the proportion coefficient of said each process station.

17. The method of claim 12, wherein, the clustering is a neighbor propagation clustering.

18. A non-transitory computer readable medium, on which a computer program is stored which, when being executed by a processor, implements the method for determining the maximum quantity of work in process according to claim 12.

* * * * *